United States Patent
Benham et al.

(10) Patent No.: US 8,396,770 B2
(45) Date of Patent: Mar. 12, 2013

(54) SYSTEM FOR CREATING, ISSUING, MANAGING AND REDEEMING ANNUITY-BASED RETIREMENT FUNDING INSTRUMENTS

(75) Inventors: Bret L. Benham, Weddington, NC (US); James Benjamin Williams, Sherborn, MA (US); Francois G. Gadenne, Marblehead, MA (US)

(73) Assignees: James B. Williams, Sherborn, MA (US); Franncois G. Gadenne, Sherborn, MA (US)

( * ) Notice: Subject to any disclaimer, the term of this patent is extended or adjusted under 35 U.S.C. 154(b) by 0 days.

(21) Appl. No.: 12/804,329

(22) Filed: Jul. 20, 2010

(65) Prior Publication Data

US 2010/0293082 A1 Nov. 18, 2010

Related U.S. Application Data

(63) Continuation-in-part of application No. 11/108,079, filed on Apr. 15, 2005, now abandoned.

(60) Provisional application No. 60/562,498, filed on Apr. 15, 2004.

(51) Int. Cl.
*G06Q 40/00* (2006.01)
(52) U.S. Cl. .................. 705/35; 705/4; 705/40
(58) Field of Classification Search .......... 705/4, 35, 705/40
See application file for complete search history.

(56) References Cited

U.S. PATENT DOCUMENTS

| | | | |
|---|---|---|---|
| 6,064,969 A * | 5/2000 | Haskins | 705/4 |
| 6,415,267 B1 * | 7/2002 | Hagan | 705/36 R |
| 6,636,834 B1 * | 10/2003 | Schirripa | 705/36 R |
| 7,251,623 B1 * | 7/2007 | Ryan et al. | 705/35 |
| 7,376,608 B1 * | 5/2008 | Dellinger et al. | 705/36 R |
| 7,398,241 B2 * | 7/2008 | Fay et al. | 705/36 R |
| 2002/0188540 A1 * | 12/2002 | Fay et al. | 705/36 |
| 2002/0194098 A1 * | 12/2002 | Stiff et al. | 705/36 |
| 2003/0078815 A1 * | 4/2003 | Parsons | 705/4 |
| 2004/0172350 A1 * | 9/2004 | Atkinson et al. | 705/35 |
| 2005/0060251 A1 * | 3/2005 | Schwartz et al. | 705/35 |
| 2005/0071261 A1 * | 3/2005 | Carney | 705/35 |
| 2005/0234821 A1 * | 10/2005 | Benham et al. | 705/40 |
| 2006/0085338 A1 * | 4/2006 | Stiff et al. | 705/40 |
| 2006/0116944 A1 * | 6/2006 | Perg et al. | 705/35 |
| 2007/0011086 A1 * | 1/2007 | Dellinger et al. | 705/38 |
| 2007/0239583 A1 * | 10/2007 | Williams | 705/36 R |
| 2008/0052133 A1 * | 2/2008 | Kravirtz et al. | 705/4 |

* cited by examiner

*Primary Examiner* — Kenneth Bartley
(74) *Attorney, Agent, or Firm* — Charles G. Call

(57) ABSTRACT

A method for administering an annuity-based retirement funding in which an investor's funds or current income is used to make incremental purchases of immediate annuity benefits at market rates, with the annuity payments received from previous purchases being applied purchase additional annuity benefits. The investor allocates a first allocated portion of each received benefit into an account and the reinvested funds are thereafter available in combination with new investment payments from the investor for the purchase of additional immediate annuity benefits. At the direction of the investor, typically after retirement, all or part of the received annuity payments can be received for the use of the investor.

11 Claims, 2 Drawing Sheets

SYSTEM FOR CREATING, ISSUING, MANAGING AND REDEEMING ANNUITY-BASED RETIREMENT FUNDING INSTRUMENTS

CROSS REFERENCE TO RELATED APPLICATIONS

This application is continuation-in-part of U.S. patent application Ser. No. 11/108,079 filed on Apr. 15, 2005 now abandoned which is a Non-Provisional of U.S. Provisional Patent Application Ser. No. 60/562,498 filed on Apr. 15, 2004. This application claims the benefit of the filing date of each of the foregoing applications, the disclosures of which are incorporated herein by reference.

FIELD OF THE INVENTION

This invention relates to methods for creating and managing obligations which provide future income, particularly for funding retirement.

BACKGROUND OF THE INVENTION

Historically, as life expectancies expanded and there were public and corporate policies for older workers to retire, employers would create pension plans where the individual's retirement income liability was funded as a side-effect of employment. The funding could be made by the employer, the employee, or both. Typically in employer-funded plans, the amount of income provided was determined by a formula usually including years of service and income earned. Over time, there has been a shift from these Defined Benefit plans to Defined Contribution plans (in the U.S., like 401(k) Plans), where the income provided in retirement is not predetermined, but rather is the result of whatever contributions were made by the employee during his career, the subsequent returns on the invested contributions, and the method of withdrawal of those accumulated investments. In general, Defined Benefit plans had the benefit of simplicity for the employee, but suffered from lack of portability of the accumulated value to other employers or plans, and suffered from the risk of financial failure of the employer. Defined Contribution plans offered transparency (the assets are owned for the benefit of the individual employee) and control (the employee within limits can choose the timing and amount of contributions and withdrawals), but suffer in that the resulting retirement income cannot be planned with assurance.

The usual way to provide a future income given an amount of saved money now is with a deferred annuity: for a deposit (or premium) now, a series of payments is made in the future, where the amount, periodicity, and number of payments is defined in the deferred annuity contract or policy. The contract may also describe how the initial deposit accumulates returns until the first payment is made (accumulation period), and how the payment stream (payout period) relates to the deposit and accumulated investment returns. The returns may be at a fixed rate, or at rates varying with the returns experienced in defined investment portfolios, or based on formulas such as a stock market index. Similarly, during payout, the amount of payments may be fixed, may change at a fixed rate over time, may change by a formula such as an inflation index, or may change based on returns experienced in investment portfolios. The payments may be made for the lifetime of one or more individual persons, for a set number of periods, or a combination.

Deferred annuities usually have an option for the owner of the contract to choose whether to withdraw the accumulated deposit(s) with returns in a lump sum, or convert the value to annuity payments with a defined rate of conversion. The advantage is that, depending on the particular definition of accumulation and payout conversion, the owner can know at the time of the deposit what income will be provided in the future. In general, this is dependent on a fixed or guaranteed minimum return during accumulation, and a fixed or guaranteed minimum rate of conversion (i.e., for an annuitant at age 65 at conversion, each $1,000 of accumulated value can convert to, say, $6/month of income for as long as the annuitant lives). While many savers will appreciate the flexibility of the option to choose the lump sum or the annuity, the option imposes a set of costs and constraints, in particular, adverse selection. (Adverse selection is the phenomenon that the individual can choose to take the lump sum if he feels he knows that he will not live as long as the average life expectancy. Thus, the population of annuitants will be skewed to have a life expectancy longer than the general population, and this means that life-based annuity payments must be less than implied by the general population's life expectancy.)

SUMMARY OF THE INVENTION

The present invention takes the form of a method of managing an investment plan fund established by an agreement entered into between a plan administrator and an individual investor. Pursuant to and as specified by the agreement, the plan administrator establishes an account for holding funds for the benefit of the investor, periodically accepts investment payments from the investor and deposits these payments into the established account on behalf of said investor, periodically applies all or part of the current assets in the account to purchase, at a stated current market price, an immediate annuity that obligates the issuer of annuity to thereafter make periodic annuity benefit payments to the investor in amounts and at times specified by the purchased immediate annuity, and pays out to the investor a second allocated portion of each of said period annuity payments for the use of investor as a plan benefit.

Further, the administrator may, at the direction of the investor, reinvesting at least a first allocated portion of each of the periodic annuity benefit payments back into the account when paid by said issuer to thereby increase the total assets of the account that are thereafter available, in combination with new investment payments from the investor, for the purchase additional immediate annuities.

Typically, but not necessarily, each purchased immediate annuity obligates its issuer to thereafter make periodic annuity payments for the life of said investor or the investor, or the investor and a named survivor, whomever lives longer. The issuer may also be obligated to make payments for no less than a specified payout duration (e.g., ten years), even if the investor or the investor and the named survivor die earlier.

So that the practical effect of each immediate annuity purchased may be more clearly understood by the investor, the current market price at which each annuity is offered is preferably stated as a unit of a specified currency payable at stated periodic calendar intervals. For example, a 45 year old investor may be informed that each $197.22 purchases $1/month for life (with 10 years of payments guaranteed).

The stated current market price as published or made available is calculated by or for the plan administrator based on the specific terms of the agreement and time varying factors selected from a group including actuarial data, interest rates, market data, plan administration costs, and reserving requirements imposed on said plan provider or the issuers of annuities. This stated market price is used to calculate the annuity benefits which the investor will receive when funds in the account are used to purchase those benefits.

Under the terms of the plan agreement, the purchased immediate annuities may obligate the issuer to make periodic annuity payments to the investor in amounts which may vary in a specified way in accordance with at least one specified index value ascertainable on or about the time the annuity payments are made. The index may be a published price or inflation index, a published value reflecting the current price or performance of a group or portfolio of stocks or other specified investments, or be indicative of the return produced by one or more specified investments. The purchased immediate annuities may include a "commutation option" which gives the annuitant the option to convert all or a designated portion of future annuity payments into a lump sum payment to the annuitant at the time the commutation option is exercised. For example, a retired annuitant who is receiving $560 monthly for life might decide to commute 7.5% of his future payments in order to receive a $5,400 lump sum payment to pay for a trip abroad, reducing his remaining future monthly payments to $510 for life. The portion of the future benefits that may be commuted may be limited by the plan; for example, the annuitant may be allowed to convert no more than 10% of future benefits during a given year, with a maximum of 20% of future payments being commutable over the life of the contract. The cost to the annuity issuer of providing a commutation option can be reflected as an adjustment to published current market price of each offered annuity if the commutation option is added to the plan. In this way, the purchasing investor will understand the practical effect of adding the commutation option to the annuity being purchased.

The agreement entered into between plan administrator and the individual investor may be a single agreement entered into at the onset of the relationship, or may take the form of a plurality of different agreements entered into between the administrator and the investor at different times. The investment payments from said individual may be accepted directly from one or more of said investor's employers as payroll deductions or deferrals automatically transmitted to the administrator for deposit into said account.

The immediate annuities are preferably secured by one or more investments which provide a return that varies with changing actuarial expectations, interest rates, or a combination thereof.

BRIEF DESCRIPTION OF THE DRAWINGS

In the detailed description which follows, reference will be made to the attached drawings, in which.

DETAILED DESCRIPTION

Figure 1:
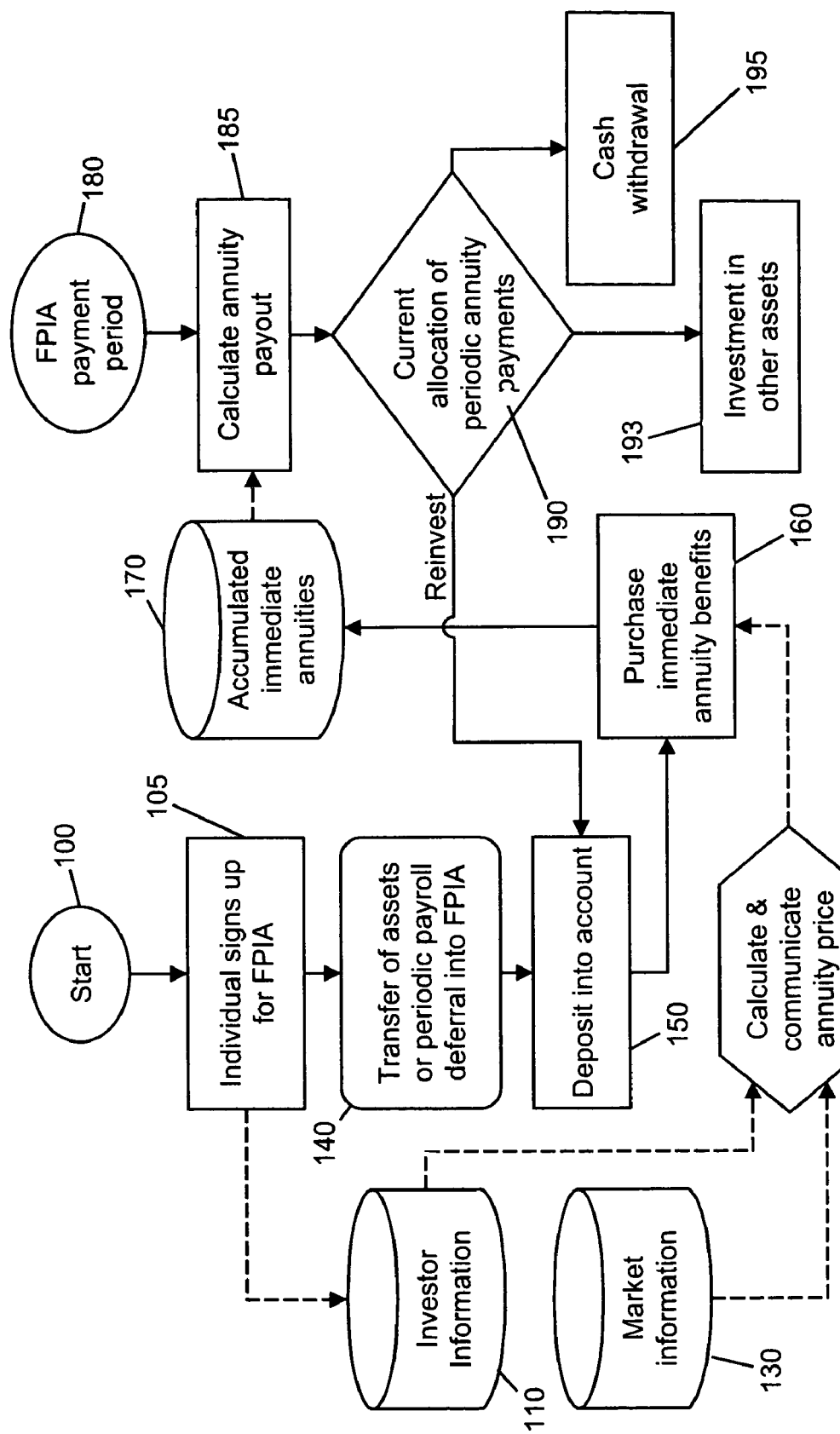
FIG. 1 is a flow chart showing an illustrative process for creating, issuing, managing and redeeming FPIAs.

The present invention contemplates the creation, issuance, management and redemption of a new kind of annuity-based retirement funding instrument which can be called a "flexible-premium immediate annuity" (FPIA). The invention recognizes and takes advantage of the fact that the effects of deferred annuity income can be achieved with immediate annuities, with additional advantages.

The basic idea is to use savings (either previously accumulated moneys or a portion of current income) to purchase a series of immediate annuities. The annuity payments are not taken as income by the individual, but rather are directed to purchase additional annuity contracts or other retirement investment products. Reinvestment of payments and subsequent deposits in additional annuities is analogous to a bond "ladder," where a series of bonds are purchased with increasing maturity dates, so we call this process "laddering immediate annuities."

When payments are directed to reinvestment in additional annuity contracts, the effect is similar to the compounding of returns during accumulation in a deferred annuity, with the difference that there is no option to take a lump sum, so the problem of adverse selection is reduced (adverse selection is likely to be more pronounced with increasing age). An option or guarantee allowing withdrawal of a lump sum has a cost; consequently, eliminating such an option allows the amount of the payments to be increased, other factors being the same. Note that the annuity payment stream can be redirected at will, being apportioned (a) to withdrawal as cash for the benefit of the owner, (b) to reinvestment in the FPIA for compounding, or (c) to investment in other financial assets, all to whatever degree makes sense to the owner, within the constraints of the tax and regulatory frameworks.

In the preferred embodiment, the immediate annuities may have period-certain features (e.g., payments will be made to the later of life or until age 65 or 10 years from the deposit) to address the practicalities of providing for a family and to avoid the fear of "leaving money on the table" due to early death.

Ordinarily, immediate annuities are available only in larger amounts, such as a minimum $25,000 premium. To be practical for payroll deferrals, we propose a more efficient structure of flexible-premium immediate annuity (FPIA) contracts, where on a single contract or on an individual's membership in a group annuity contract, small deposits or premiums can be made at any time. The administrator or servicer of the contract keeps track of the total deposits, the terms under which each incremental deposit is made, and the termination of guarantees associated with each deposit. In particular, the conversion rate of a deposit to periodic income will change with the age of the annuitant and with current interest rates, among other possible factors. For example, each month (or week or day), the annuity provider can publish the rate table so that a saver can understand what to expect for his deposits. This process can be similar to the depositor accounting for stable value funds, guaranteed investment contracts, etc., although more factors are tracked for FPIAs.

It is particularly advantageous to provide these rates in terms of the price for a unit of income, e.g., for a 45-year old saver, each $197.22 purchases $1/month for life (with 10 years of payments guaranteed). This makes it easy for the saver to make the tradeoff between consumption now and retirement income later. Because the income begins immediately (even if not withdrawn from the account), flexible-premium immediate annuities thus have the important benefits of showing the saver at all times how much life income has been guaranteed or "locked in". While all factors can't be known precisely in advance, it also makes it easy to make estimates of future income benefits that can be accumulated under reasonably expected conditions.

It is seen that the basic structure of laddered immediate annuities or flexible-premium immediate annuities can have a number of useful variations, including but not limited to: (1) indexing of payments to a formula such as a price inflation index, and (2) indexing of payments to a formula including an investment index or the results of an investment portfolio.

Other schemes have been offered that involve multiple or sequential purchases of life-income annuities, but these are designed for taking savings accumulated in conventional vehicles, such as stock and bond funds in retirement accounts, and converting them into retirement benefits during a period beginning at or near retirement. The retirement benefits may include annuities for providing income as well as withdrawal programs from continued investment in financial assets such as stock and bond funds. The current invention reverses the intention of conventional products and processes by using immediate annuities as the foundation of the savings process, allowing the accumulation of guaranteed life-time income along with the option of accumulation of traditional financial assets.

In addition to a focus on the process of converting assets to income at or near retirement rather than on accumulating an income benefit throughout one's savings career, the other approaches do not solve some of the problems that retirement savers face, such as knowing the retirement income they can expect and reducing the risk of a retirement income shortfall relative to their income needs. The typical saver is given choices only among "risky" assets (such as stock and bond funds that have no minimum return) or money market funds or equivalents that provide the lowest expected returns in exchange for minimum risk of downside. Such conventional assets do not provide the "asset/liability matching" that would normally be employed to defease the liability represented by the need to fund retirement income for an unknown number of years.

FPIA products, by indicating a minimum income from the outset, address the first problem, and by having minimum income for each incremental investment, act to build a floor income for the saver to depend on, and so can greatly reduce the risk of shortfall.

Figure 2:
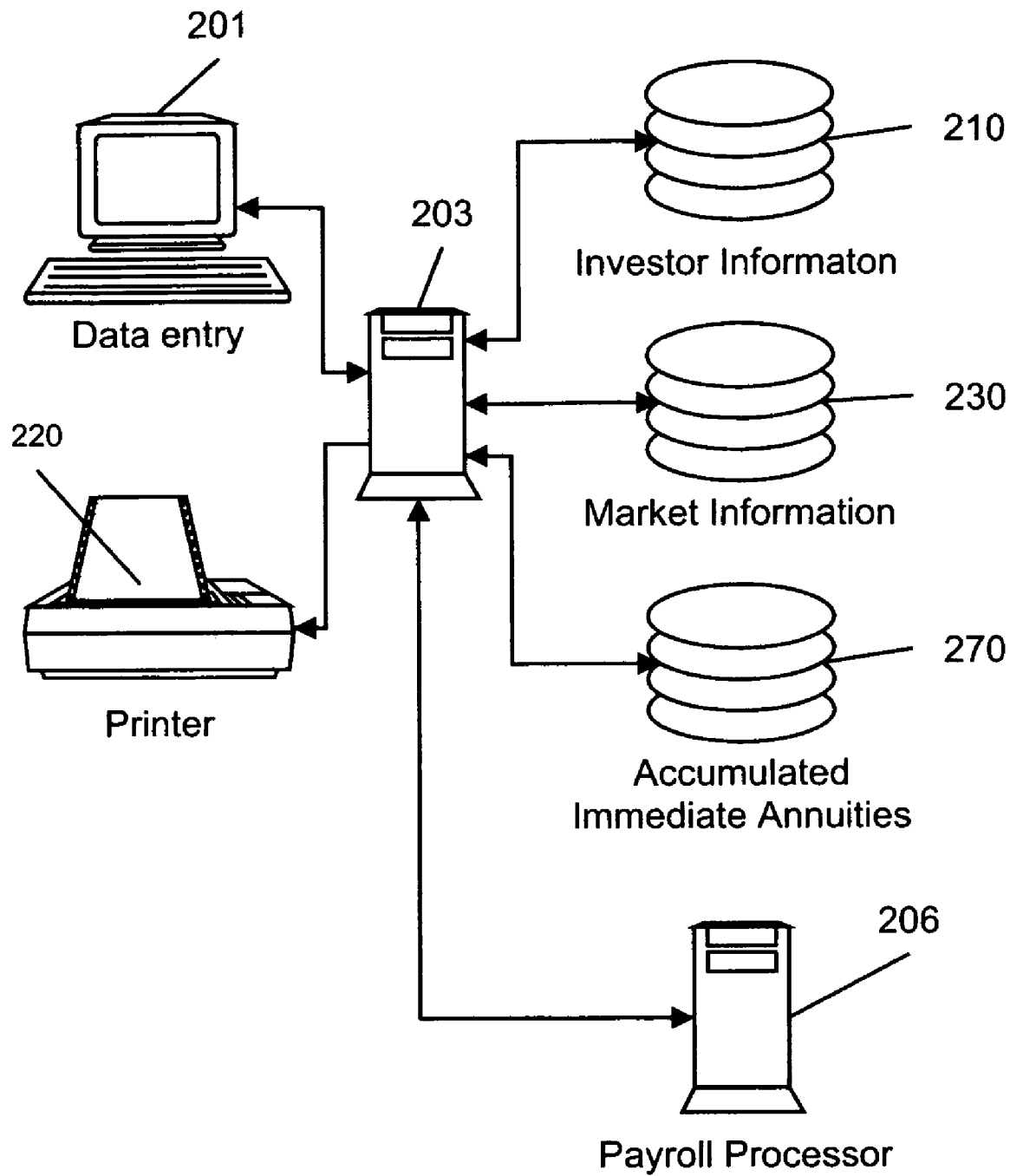
FIG. 2 is a block diagram showing a conventional computer for implementing the process seen in FIG. 1.

As noted above, pursuant to and as specified by the agreement with the investor, the plan administrator establishes an account for holding funds for the benefit of the investor which is described in the investor information database seen at 110 in FIGS. 1 and 210 in FIG. 2. Information describing the investor's account may be initially entered and thereafter modified using the workstation 201 connected to the provider's processor 202. As the administrator periodically accepts investment payments from the investor and deposits these payments into the established account on behalf of said investor, the times and amounts of these deposits are recorded by the processor 210 in the investor information database 210. The provider's processor 203 periodically applies all or part of the current assets in the account to purchase, at a stated current market price, an immediate annuity that obligates the issuer of annuity to thereafter make periodic annuity benefit payments to the investor in amounts and at times specified by the purchased immediate annuity, and further calculates any amount to be paid out to the investor as a second allocated portion of each of said period annuity payments for the use of investor as a plan benefit.

If, at the direction of the investor, the provider has been instructed to reinvest an allocated portion of each of the periodic annuity benefit payments back into the account when paid by said issuer, the processor 203 accordingly increases the total stated asset amount that is thereafter available, in combination with new investment payments from the investor, for the purchase additional immediate annuities.

So that the practical effect of each immediate annuity purchased may be more clearly understood by the investor, the current market price at which each annuity is offered is preferably stated as a unit of a specified currency payable at stated periodic calendar intervals. This stated current market price is determined by the annuity provider periodicaly stored in database 110 (210 in FIG. 2) where it is available to the processor 203, or is calculated by processor 203 and stored in the datgabase, and then published or made available as seen at 120, for example by a report printer 220 based on the specific terms of the agreement as stored in the investor information database 110 (seen at 210 in FIG. 2), and time varying factors selected from a group including actuarial data, interest rates, market data, plan administration costs, and reserving requirements imposed on said plan provider or the issuers of annuities as specified by data as specified in the market information database 130 (seen at 230 in FIG. 2). This stated market price is used to calculate the annuity benefits which the investor will receive when funds in the account are used to purchase those benefits.

Typical Steps for Providing FPIA Products

As seen in the flowchart in FIG. 1, the process starts at 100. When an individual signs up to create an FPIA account with an insurance company or other FPIA provider as seen at 105, the individual investor may select among options, such as whether the payments are fixed, increase according to a formula, are indexed to an inflation measure, or based on a participation in a performance index such as a stock returns index or participation in an investment portfolio. Basic data such as the individual's birth date and survivor beneficiaries are collected using a data entry station seen at 201 coupled to the processor 203 as seen in FIG. 2, and stored for later use, typically in a database for storing investor information as indicated at 110 and at 210 in FIG. 2. Along with the options selected, these data may be used to classify the individual (hereafter called the owner). The classification is used in the pricing of income units and for other purposes in managing the FPIA. If the FPIA is related to a payroll deferral plan, such as a tax-qualified retirement plan, information about the amount and timing of payroll deferrals that are to be deposited in the FPIA are transmitted to the payroll processor seen at 206 in FIG. 2 as required.

As indicated at 120, the provider may employ the processor 203 to calculate on a regular basis the current purchase rate or price per income unit for each classification. The information used to calculate pricing, stored in the market information database seen at 130 in FIG. 1 and 230 in FIG. 2, can include actuarial data such as expected longevity, interest rates and other financial market information, costs of providing the FPIA, and profit and reserving requirements for insurance companies or providers.

As seen at 140, payroll deferral amounts are periodically transferred to the FPIA provider's processor 203 from the payroll processor 206 to serve as a new deposit in the FPIA account. Also, the owner may choose at times to transfer amounts from other investments into the FPIA, as allowed by regulations. The amounts and times of these deposits other investments from the investor into the FPIA may be entered using the data entry workstation 201 and stored by the processor 203 in the investor information database 210 which stores information about the investors FPIA account.

Any time there is a deposit into the owner's FPIA account from any source, as shown at 150, the amount is converted by the provider's processor 203 into a number of income units (by dividing the amount being deposited by the price per unit calculated at 120, and the number of new units are recorded by the processor 203 in a data base for storing data on the accumulated immediate annuities as indicated at 170 in FIG. 1 and at 270 in FIG. 2.

Periodically, at established intervals specified at 180 (in the preferred embodiment, monthly), payment processing is performed by the provider's processor 203 seen in FIG. 2. This involves calculating the payment per unit of each class of unit as seen at 185 based on the classification saved in the database 110 (210 in FIG. 2). The calculation performed at 185 depends on the conditions defined for the FPIA product and the options selected by the owner at 105. The payment may be constant per income unit, or may vary based on a number of defined factors, as discussed above.

As indicated at 190, the payouts to the owner calculated at 185 are allocated based on the options selected at 105 and stored in the investor information database at 110 in FIG. 1 and 210 in FIG. 2, possibly changed from time-to-time thereafter. There may be regulatory or policy constraints on the allocations and how they are changed. Each payment will be allocated across one or more choices, including (A) reinvestment (that is, by depositing all or part of the payment back into the FPIA account at 150) (B) investment in other assets such as stock and bond funds as indicated at 193; or (C) a cash withdrawal by the owner as indicated at 195. The provider's processor 203 stores or modifies the data on the accumulated immediate annuities in the accumulated annuities database seen at 170 in FIG. 1 and at 270 in FIG. 2.

Securitization of Insurance Risks

Reinsurance has been a common practice for many years. One insurance company contracts with another (the re-insurer) to take a portion of the first company's risk for a certain segment of its business. In a few cases, the reinsurance function is taken on by non-insurance firms or individuals in the form of securitizations or structured financial products. An example is a "Cat bond" where a class of catastrophe or natural hazard loss risks are taken on by security holders. Simply, a bond issue is sold by the insurance company, and the returns to the bond holders are determined by a stated interest rate less the amount of insurance company losses beyond a certain level. Losses are limited to the face value of the bond and accrued interest.

Similar techniques can be applied to other risks, such as the longevity risk that exists in the FPIAs described above. For example, the longevity risk (the risk that the lives of the individuals in the pool will extend beyond the life expectancy assumption when the payouts of the annuities were priced) of a pool of immediate annuities (of all kinds, not just FPIAs) can be securitized in a number of ways. These include, but are not limited to: (1) longevity bonds (similar to Cat bonds) where the return on a bond issue is determined by the population life experience in the pool, so that if the population lives longer than expected, the return is reduced; and (2) swaps, where the insurer makes a stream of payments to a counterparty a set rate based on actuarial expectations and interest rates, at the same time the counterparty makes a stream of payments to the insurer based on the annuity payments owed to the annuitants.

In either case, the life of the longest lived member of pool can be quite long, even if the average life expectancy is only a few years. To make these securitizations practical, there may be a limited time, or maturity, at which time the pool is evaluated according to its actual experience, and a settlement reached with the bondholders or counterparties.

A more interesting packaging of the securitization is to combine a pool of annuities with natural hedges, such as permanent life insurance obligations, disability insurance obligations, and/or long-term health care obligations. While these are not perfect hedges, they do allow the securitizations to be leveraged (in effect, lower reserves are required to back the insurance function, whether the counterparties or bondholders are themselves insurance companies, or not).

Conclusion

It is to be understood that the methods and apparatus which have been described above are merely illustrative applications of the principles of the invention. Numerous modifications may be made by those skilled in the art without departing from the true spirit and scope of the invention.

What is claimed is:

1. A system for managing an investment plan fund account in accordance with one or more agreements entered into between a plan administrator and an individual investor, said system comprising:
   a data entry device;
   one or more databases storing:
   a. data describing one or more terms of said one or more agreements;
   b. data specifying the birth date of said individual investor;
   c. actuarial data indicative of a current life expectancy of said individual investor;
   d. financial market data including current interest rates;
   e. data indicative of one or more costs of creating and managing said investment plan fund account;
   f. data indicative of profit and reserving requirements to be paid from said investment plan fund account; and
   g. data that specifies accumulated benefits payable to said individual investor by each of a sequence of individual immediate annuities purchased by or on behalf of said individual investor pursuant to said one or more agreements; and
   a processor coupled to said one or more databases and to said data entry device for maintaining said account by:
   a. periodically processing data from said one or more databases to calculate and make available to said individual investor a stated current purchase price of a currently offered individual immediate annuity that will entitle said investor to receive periodic annuity benefit payments in amounts and at times designated by one or more terms of said currently offered individual immediate annuity;
   b. accepting over time from said data entry device a sequence of input values each indicating an amount deposited into said investment plan fund account by or on behalf of said individual investor at a time chosen by said individual investor;
   c. in response to the acceptance of each such input value, determining and recording in said account the annuity amounts and payment times of the annuity benefit payments to be paid to said individual investor under the terms of said currently offered individual annuity purchased by or on behalf of said individual investor in consideration for the deposited amount; and
   d. periodically calculating a combined annuity benefit payment currently payable to said individual investor by a combination of individual annuities previously purchased by said investor.

2. The system for managing the investment plan account fund as set forth in claim 1 wherein, pursuant to one or more allocation instructions accepted from said investor, said processor applies an allocated portion of benefit payments payable to said investor to increase the annuity benefit payment of the currently offered immediate annuity next purchased by said investor.

3. The system for managing the investment plan fund account as set forth in claim 2 wherein each of said sequence of individual immediate annuities entitles said investor to receive periodic annuity benefits for the life of the investor.

4. The system for managing the investment plan fund account as set forth in claim 2 wherein said stated current purchase price made available to said investor is expressed as an amount required to purchase a currently offered immediate annuity that will provide a specified monetary unit of a specified currency payable to said investor at periodic calendar intervals.

5. Apparatus for managing an investment plan fund established by an agreement entered into between a plan administrator and an investor comprising:
  one or more databases storing data including:
    (1) data describing terms contained in said agreement;
    (2) annuity withdraw options selected by said investor;
    (3) a current asset balance in said account; and
    (4) data describing said investor's ownership interest in a sequence of immediate annuities, wherein each annuity of the sequence of immediate annuities is purchased at a different time for said investor from available current assets in said account at the time when said each annuity is purchased;
  a data entry device; and
  a processor coupled to said one or more databases and said data entry device performing the steps of:
    (1) determining a current market price per unit of a currently available immediate annuity that obligates an issuer of said currently available immediate annuity to thereafter make periodic annuity benefit payments to said investor, said annuity benefit payments being in amounts and at times specified by said currently available immediate annuity, and generating an output of said current market price per unit in a form perceptible to said investor;
    (2) processing deposit data from said data entry device, each deposit data describing one of a series of new investment deposits into said account from said investor, each of said new investment deposits being in an amount and at a time selected by said investor after said agreement is entered into between said plan administrator and said investor, said processor processing said each deposit data of said series of new investment deposits by:
      (a) accepting said deposit data on or about the time when said deposit is made into said account;
      (b) storing said deposit data in said database;
      (c) after said deposit is accepted, determining an amount available in said account for the purchase of units of said currently available immediate annuity at said current market price per unit,
      (d) storing data describing the benefits payments to be made to said investor from units of said available immediate annuity purchased on behalf of said investor at said current market price per unit; and
      (e) recalculating and storing said current asset balance; and
    (3) periodically, at established intervals specified by said agreement, performing payout processing by:
      (a) determining an amount currently payable to said investor from said account in accordance with said agreement; and
      (b) processing said data based on said account including said options selected by said investor as stored in said database to allocate said amount payable into optional amounts including:
        1. a reinvestment amount that is to be re-deposited into said account on behalf of said investor;
        2. a separate investment amount to be invested in other assets on behalf of said investor; and
        3. a cash withdrawal amount to be paid to said investor.

6. Apparatus for managing the investment plan fund as set forth in claim 5 wherein none of said series of separate, immediate annuities obligates said issuer to make any payment to said investor other than said periodic annuity payments.

7. Apparatus for managing the investment plan fund as set forth in claim 6 wherein each of said immediate annuities obligates said issuer to make periodic annuity payments for the life of said investor.

8. Apparatus for managing an investment plan fund as set forth in claim 5 wherein said current market price per unit is expressed as an amount required to purchase an immediate annuity that will provide a specified monetary unit of a specified currency payable at periodic calendar intervals.

9. Apparatus for managing an investment plan fund as set forth in claim 5 wherein said agreement entered into between said plan administrator and said investor includes a commutation option that permits said investor to elect to convert a designated portion of said benefit payments to be made to said investor into a lump sum payment.

10. Apparatus for managing an investment plan fund as set forth in claim 9 wherein said representation of said current market price per unit is expressed as an amount required to purchase an immediate annuity that will provide a specified monetary unit of a specified currency payable at periodic calendar intervals.

11. Apparatus for managing an investment plan fund as set forth in claim 10 wherein said specified currency payable at periodic calendar intervals is one dollar payable monthly.

* * * * *